Aug. 3, 1971  J. F. JAMMET  3,597,276

BATTERIES WITH FLAT CELLS

Filed Dec. 26, 1968

INVENTOR
JEAN FIRMIN JAMMET
BY
ATTORNEYS

United States Patent Office 3,597,276
Patented Aug. 3, 1971

3,597,276
BATTERIES WITH FLAT CELLS
Jean Firmin Jammet, Poitiers, France, assignor to Societe des Accumulateurs Fixes et de Traction (Societe Anonyme), Romainville, France
Filed Dec. 26, 1968, Ser. No. 786,989
Claims priority, application France, Dec. 28, 1967, 134,172
Int. Cl. H01m 21/00
U.S. Cl. 136—111                                    4 Claims

ABSTRACT OF THE DISCLOSURE

Electrochemical generators or batteries using stacked so-called flat cells in a tubular main sheath whose inner profile is shaped to maintain the cells of the stack and components in place and to insure intercell sealing are disclosed. The tubular sheath in turn is covered by an extensible second or outer sheath of plastic material which first is stretched to permit mounting in it of the main sheath and then allowed to contract. This effects application of compressive forces to the first sheath and its stacked cells, both laterally and axially. As a further feature, the outer plastic sheath is further treated prior to insertion into it of the main sheath to cause its subsequent further shrinkage as by application thereto of an appropriate solvent serving as a deplastifying agent which, upon evaporation creates the further shrinkage. The compression effect on the inner sheath and contents of the contraction of the outer plastic sheath as a result of release of stretch and its further contractive shrinkage as a result of evaporation of solvent is distributed uniformly providing more certain and regular insulation and internal sealing of the cells of the stack in the main tubular sheath.

BRIEF SUMMARY OF THE INVENTION

Figure 1:
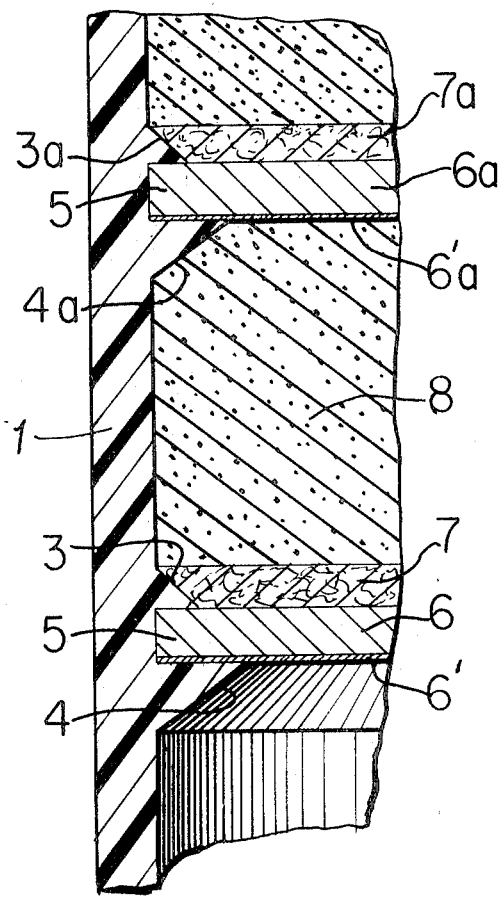

This invention relates to electrochemical generators or batteries using so-called flat cells, constructed by stacking the said cells in a tubular sheath having an inner profile or shape designed to hold the components of the flat cells in place within the sheath and to insure intercell sealing.

Primary batteries with flat cells have already been proposed in French Pat. No. 1,071,282, filed Dec. 8, 1952, by Société de la Pile Leclanché (no corresponding U.S. patent) which describes a tubular sheath made of a material that is porous to gases and comprising internal circular grooves located at intervals in the wall thickness, the said grooves being additionally fringed with at least one reinforcement in order to provide a larger rib. These grooves are provided so as to maintain in place in each thereof a duplex type electrode formed by a zinc disc comprising on one side a conductive plastic coating which latter is positioned to lie against the positive active material, such as manganese dioxide, of the next adjacent cell of the battery, in order to series connect the cells.

A duplex zinc electrode with its associated zinc face up having been put in position in one of the grooves, the stacking proceeds by laying over its uncoated zinc face a washer of paper previously soaked with electrolytic salts and dried, and constituting a separator, then a depolarizing mix impregnated with electrolyte is placed over the washer and, thereafter, another duplex electrode with conductive plastic coating face down is inserted into the next groove and so on until the desired number of stacked cells is achieved.

When all the duplex electrodes have been inserted into the grooves the result is a battery of stacked series-connected cells since each duplex electrode is at the same time the negative electrode of one cell and the positive electrode of the next adjacent cell. Intercell sealing is effected by the sheath structure and more particularly by the above-defined grooves in which the edges of the duplex electrodes have respectively been inserted.

Use of a shrinkable porous casing, made of a sheet of suitable paper has been proposed to tighten the stacked cells contained in the grooved sheath, and more particularly to grip the groove lips over the edges of the duplex electrodes. A contraction of the casing resulting from the wetting of the paper whose dimensions are somewhat reduced followed by subsequent drying is utilized so that the stacked assembly contained in the paper casing becomes subjected to a certain amount of compression.

However, this practice has shown that the contraction of the paper is haphazard and thus that individual cell tightening is not adequately regular, nor is the global tightening required for manufacturing products of uniform and correct grade achieved.

In addition, if batteries utilizing such paper sheaths comes into contact with water or moisture, the paper loosens and battery operation becomes compromised since intercell sealing is no longer sufficient due to such loosening and resultant poor compression and/or global tightening.

In order to obtain the required compression and global tightening another known expedient is to shrink by a partial deplastification the grooved plastic sheath containing the stacked cells of the primary battery by using an appropriate solvent as deplastifying agent. Practice has shown that this expedient had two essential drawbacks: (a) since the sheath becomes set on evaporation of the solvent, intercell sealing is no longer certain where the groove lips engage the edges of the duplex electrodes, and on the other hand, (b) the solvent used as deplastifying agent may be detrimental to satisfactory electrochemical operation of the active materials of the stacked cells.

In addition, the plastic sheath intended to contain the stack of flat cells constituting the battery must be strong and thick enough to withstand overstretching when the duplex electrodes of a diameter slightly larger than that of the said sheath are mounted in its grooves. Deplastifying then cannot be satisfactory because of the said thickness and also because only the outer side can be put into contact with the deplastifying solvent since the latter is detrimental to active material operating in the cells if it comes into contact therewith. The resulting irregularities of the solely external deplastification may thus lead to undesirable stresses in the sheath so that the final shape of the battery is not as regular as is desired and required for commercial usage.

Finally, as another expedient the solution consisting of mounting a metal tubing over the plastic sheath and setting it around both ends of the stack contained in the plastic sheath has not given good results because of the irregularity of the compression axially along the stack in the sheath, so that individual cells are not equally or uniformly compressed.

Objects and features of the present invention are to avoid the above-mentioned drawbacks of the known expedients and provide a procedure that can be applied to all types of electrochemical generators using flat type cells. This procedure will be described for primary batteries utilizing so-called flat cells.

The novel procedure is described with relationship to a battery using flat cells, obtained by successive stacking of the components of said cells in a tubular plastic sheath having an inner profile designed to hold in place the components of respective cells and for insuring intercell sealing. This procedure is particularly remarkable in that the said plastic sheath, or main sheath, is further covered with another stretchable plastic sheath in stretched condition and is submitted by this second sheath to a compression by contractions of the second sheath which are effected in two successive steps.

According to the invention, the dimensions of the second sheath which is stretchable are initially smaller than that of the battery assembly contained in the main sheath and the second sheath is stretched to permit insertion of the assembly. The first compression step is effected by releasing the initially overstretched outer sheath to allow it to contract about the main sheath of the assembly that has been inserted into the stretched sheath. This resulting contraction of the second or outer sheath provides the first compression step.

According to the invention, the second compression step is effected by causing a further shrinkage or contraction of the said second sheath after it has been placed over the battery contained in the main sheath, for example, by wetting the second sheath with an appropriate solvent used as deplastifying agent prior to introduction of the assembly into it. Upon evaporation of this solvent the second contraction of the second sheath occurs.

Another object and feature of this invention is procedure utilizing a correlated device to permit rapid mounting into the second sheath of the assembly in the main sheath.

A battery according to the invention has especially the following advantage: not being retracted, the main sheath remains very flexible particularly about the grooves confining parts of the stacks cells; being homogeneously retracted along its entire length by the compressive effect of the second sheath, the external sheath exerts a pressure laterally as well as axially on the main sheath so that the three walls of the grooves are tightly applied against the respective edges of the duplex electrodes confined therein. As the contraction is distributed homogeneously at all points of the outer sheath during its contraction of shrinkage, each cell's components are individually compressed since the shrinkable outer sheath is necessarily restrained at the zones of duplex electrode locations. Therefore, global compression results from partial compressions applied by the outer sheath at regular intervals from place to place. Thus, insulation between individual cells is more certain and regular. This is due in part to the fact that the said second sheath can entirely be dipped in the solvent used as deplastifying agent.

According to another embodiment the second or outer sheath is made of plastified polyvinyl chloride, the contraction of which is obtained by preliminary dipping thereof in a solvent of the plastifying agent, for example, trichloroethylene. Consequently, the mounting in the second sheath of the main sheath is easy since it has been softened by the solvent. Thereafter, the said second sheath sets or hardens progressively and contracts as the solvent dries off. The rate of contraction can be practically constant since it depends exclusively on the initial percentage of plastifying agent used.

Figure 2:
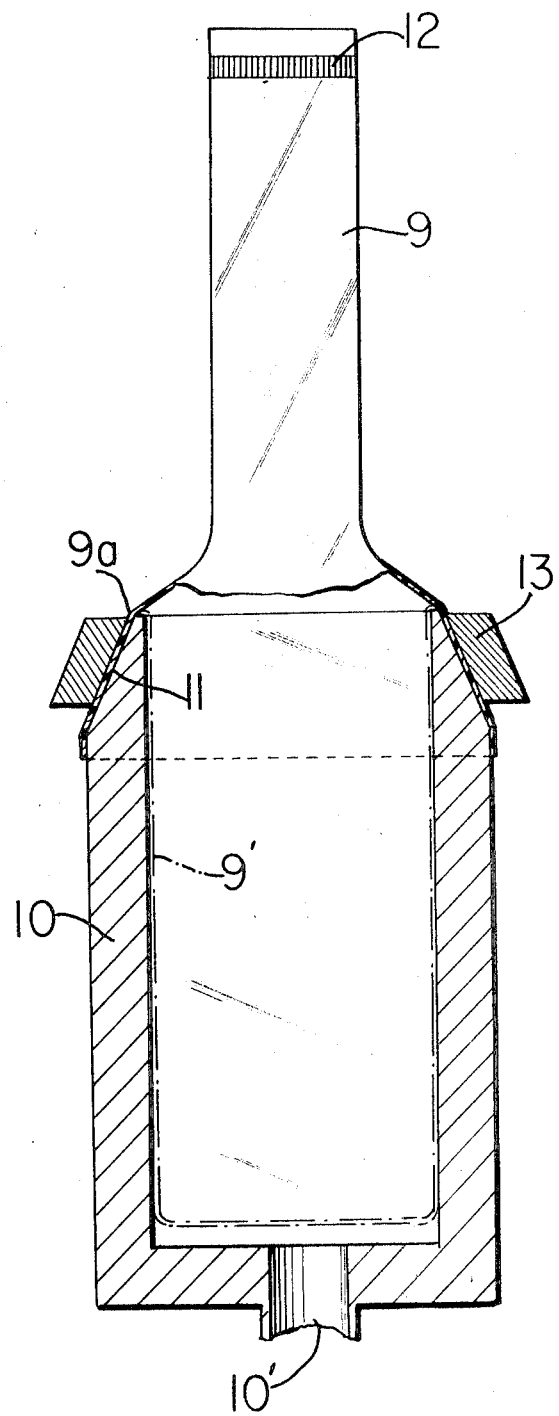
Figure 3:
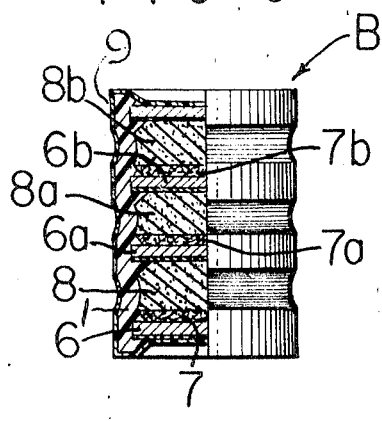

Further objects and features of the invention will become apparent from the following detailed description and the accompanying drawing forming part hereof which is illustrative but in no way a limitative example, and in which:

FIG. 1 shows on an exaggerated scale a partial cross section of the main sheath of a battery fitted with duplex electrodes, in respective of its grooves and including other cell components;

FIG. 2 schematically shows a device and procedure to permit easy mounting into the shrinkable outer sheath of the main sheath of the battery assemblies, and FIG. 3 shows a partially sectionalized view of a completed battery embodying the invention.

DETAILED DESCRIPTION

As can be seen from FIG. 1, the main sheath of the battery of stacked cells is constituted by a tubing 1 of a flexible plastic material, such as polyvinyl chloride, for example, the inner wall of which is provided with regularly inwardly facing spaced annular rims, such as 3 and 4, delimiting the grooves 5. These grooves are provided to receive the peripheries of duplex electrodes such as 6, said rims and electrodes 6 being so associated in the grooves to develop sealed intercell junctions by pressure exerted by the walls delineating the grooves on the rims of the electrodes lying therein. Each duplex electrode comprises, for example, zinc coated on one face with a conductive coating 6' of suitable plastic material.

In assembling the battery, a duplex electrode 6 with its coating 6' facing down is mounted in the lowermost groove 5 of tubing 1. Then, a dried washer 7 previously impregnated with active salts of conventional type is mounted over the upper uncoated zinc face of the duplex electrode 6. Then, a conventional depolarizer mix containing conductive material and depolarizer impregnated with electrolyte is mounted over washer 7 to the level of the upper surface of rim 4a. Then, a second duplex electrode 6a is mounted in groove 5a between rims 3a and 4a with its coating 6'a facing down. This procedure is repeated in succeeding cells until the required number of stacked cells is achieved.

When the proper number of cells has been stacked automatically or manually inside the main plastic sheath 1, the entire battery assembly is then ready to be introduced according to the invention into an outer flexible plastic sheath 9 of stretchable material, for example, of plastified polyvinyl chloride, whose diameter in unstretched condition is inferior to that of the battery assembly including the main sheath 1. The outer sheath 9 prior to application has been dipped into a solvent or deplastifying agent such as trichloroethylene. To facilitate this operation of mounting of the assembly application into the outer sheath 9, the device which is schematically shown in FIG. 2 may be used. It comprises a cylindrical vessel 10, having a diameter slightly superior to that of the battery assembly contained in the main sheath 1 and is provided with an opening 10' at its bottom. The upper external surface 11 at the upper open end of this vessel has a conical shape. This device is used as follows:

Having been dipped in trichloroethylene, the shrinkable sheath 9 made of polyvinyl chloride, in the form of a tubing of appropriate length with one end 12 closed, for example, by high frequency welding, has its open end mounted over the conical surface 11. A clamping ring 13 is then placed over it so that a tight seal is made between the surface 11 and the sheath portion 9a overlying it. Then vacuum is created inside the vessel 10 by suction via the opening 10'. As a result, the sheath 9 is drawn into vessel 10 becoming inverted and stretched to fit exactly the inner walls of the vessel 10 as shown by dotted line 9'.

Then, the battery assembly contained in the main sheath 1 can easily be introduced into the stretched sheath 9' within vessel 10 via the upper end of the latter. When environmental pressure is restored at the opening 10' and ring 13 is removed, the sheath 9 contracts about the main sheath 1 of the inserted battery and also folds over both ends of the battery which is by such contraction compressed both axially and laterally. As the trichloroethylene which has been used to wet the sheath 9 dries off, the sheath 9 contracts still more, hardens or sets and grips the doubly sheathed battery B (FIG. 3) firmly, such grip lasting very efficiently for a long time. The compression effected by the doubly contracted outer sheath 9 about the ensheathed battery is distributed both longitudinally and axially.

The general overall diameter of the battery B results from the limiting diameters of the duplex electrodes 6, 6a and is kept practically constant. However, the overall height of the sheathed battery can decrease as a result of the longitudinal or axial compression effected by the contraction of sheath 9, because the porous components of the cells (separator and depolarizer mix) are, themselves compressible, the resulting compression being naturally very favorable to effect good electro-chemical operation and thus being highly desirable. The presence of the second sheath 9 over normal/main sheath 1 according to the invention promotes this kind of compression since the height of the battery can be reduced. This is due to the fact that the shrinkable sheath 9 clings to the main sheath at the zones corresponding to the levels of the duplex electrodes 6, 6a, etc. and further contracts between these fixed zones both in diameter and in height. The resulting reduction of the height can be approximately 2 to 3%. In this way, the compression applied to every cell of the battery is much more regular in its effects that could be a more global compression of the battery in which case end cells only are mostly involved. The open end of the contracted sheath may be closed by high frequency welding subsequent to the insertion via it of the battery assembly particularly if the battery has to be protected from ambient conditions until it is to be put in use. In addition, the end 12 of the sheath 9 may also be provided with a small opening (not shown) for the passage therethrough of a terminal outlet.

A completed doubly ensheathed battery B comprising a stack of three cells encased in a primary main plastic case 1 and having a shrunk-on or contracted outer sheath 9 applied as hereinabove described, is illustrated diagrammatically on an exaggerated scale in FIG. 3.

While the procedure herein described has been with reference to preparation of a primary battery with flat cells and duplex zinc electrodes, it can be applied to any type of electrochemical generator with flat or thin cells wherein the zinc carbon duplex electrodes 6, 6a, etc. are replaced by other similar duplex electrodes structure comprising other active materials such as silver oxide, copper oxide, magnesium, aluminum, mercury oxide, cadmium hydroxide and other electrode materials. The term electrochemical generator or battery utilized herein is intended to embrace all such types of batteries with flat cells utilizing duplex electrode structure which can be initially encased in a main plastic sheath and subsequently encased in a second shrunk-on sheath applied in the manner herein described.

While specific embodiments of the invention have been presented herein, variations within the scope of the appended claims are possible and are contemplated. There is no intention, therefore, of limitation to the exact abstract or disclosure herein made.

What is claimed is:

1. An electrochemical generator comprising flat superposed individual cell constitutents arranged as a stack of cells, said constituents being uniformly compressed together in the stack, a main unitary tubular sheath of flexible material having an inner profile with inwardly facing annular rims delimiting grooves, said rims and grooves serving to support and maintain respective constituents of said cells in position within each said cell and to ensure intercell sealing, said main tubular sheath remaining permanently flexible in said generator and a second contracted sheath of extensible flexible plastic material of initially smaller size than the unitary tubular sheath covering the said unitary flexible sheath about its side wall and also over substantially the entire surface area of the opposite ends of the stack of cells and being shrunk subsequent to its mounting on said unitary tubular sheath thereby applying the main sheath and opposite ends of the generator to both axial and radial compression, said plastic material of said second sheath being settable to a selected extent of rigidity and extent of contraction to maintain the substantially uniform compression of the individual cell constituents as well as intercell sealing as effected by the permanent flexibility of the main tubular sheath.

2. An electrochemical generator according to claim 1, wherein said second sheath is principally polyvinyl chloride in a contracted state surrounding said main tubular sheath and overlapping the ends of said generator.

3. An electrochemical generator according to claim 2 wherein said second sheath is sensitive to action of a solution of a deplasticizing agent and is contracted as the effect of drying off of said solution.

4. An electrochemical generator according to claim 1 wherein said second sheath is contracted from an extensible condition and a portion of the said axial and radial compression exerted by said second sheath are effected by its natural contracted condition upon release from its extensible condition.

References Cited
UNITED STATES PATENTS

| | | | |
|---|---|---|---|
| 2,671,125 | 3/1954 | Heraud | 136—111 |
| 2,848,526 | 8/1958 | Franguemont | 136—111 |
| 2,865,976 | 12/1958 | Jammet | 136—111 |
| 2,870,235 | 1/1959 | Soltis | 136—111 |
| 3,003,013 | 10/1961 | Duddy | 136—111 |
| 3,223,555 | 12/1965 | Solomon et al. | 136—111 |
| 3,440,105 | 4/1969 | Yamamoto et al. | 136—111 |

WINSTON A. DOUGLAS, Primary Examiner

C. F. LE FEVOUR, Assistant Examiner

US. Cl. X.R.

136—132, 166